Oct. 28, 1958     S. W. ZOLDOK     2,857,729
ROTARY-TYPE MOWER BLADE
Filed Feb. 7, 1957

INVENTOR.
STEPHEN W. ZOLDOK
BY

2,857,729
ROTARY-TYPE MOWER BLADE

Stephen W. Zoldok, Spokane, Wash.

Application February 7, 1957, Serial No. 638,743

4 Claims. (Cl. 56—295)

This invention is a blade for a rotary-type mower, and more particularly a blade having upwardly deflected end portions.

It is becoming increasingly customary for the American public to use lawn mowers of the rotary blade type as opposed to those known as the reel type. However, one common fault of the rotary-type mower is that because of its ability to cut extremely long blades of grass, one's natural tendency to procrastinate is abetted, and when the grass is finally cut, the severed portions of growth are so long as to make the appearance of the lawn unsightly unless the clippings are removed. Removal of the clippings is undesirable because the clippings should remain to provide a rich humus and maintain the proper food content for the lawn and enable the soil to hold moisture.

My present invention seeks to overcome the undesirable features of the rotary-type mower, and yet permit longer periods of time between cuttings by providing means for finely chopping or comminuting the grass clippings so that the finely chopped clippings may fall among the standing stalks where they are not seen and where they are most effective in providing rich humus and moisture retention for the lawn.

In the accompanying drawings I have disclosed one physical embodiment of my present invention which, when considered in conjunction with the following specification, will be clearly understood, and in which drawing like numerals are employed to designate similar parts throughout the several views.

Figure 1:
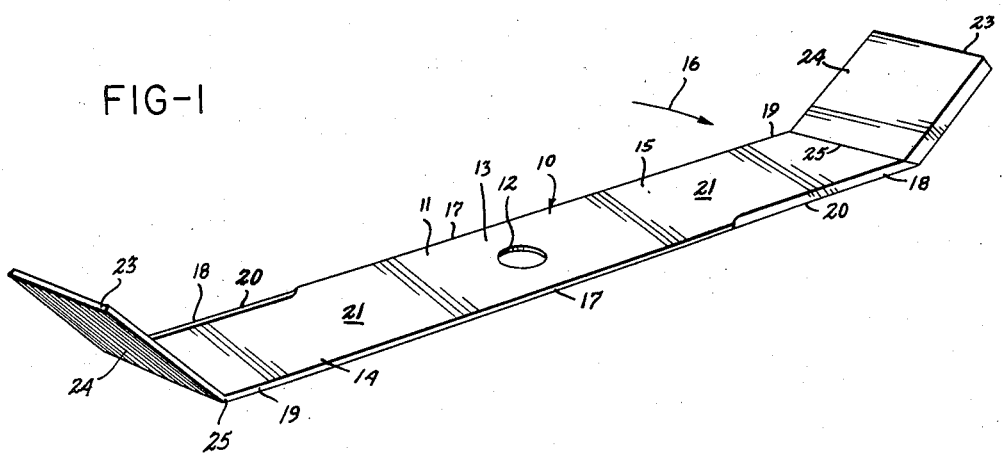
Figure 1 is a perspective view of one physical embodiment of my present invention.
Figure 2:
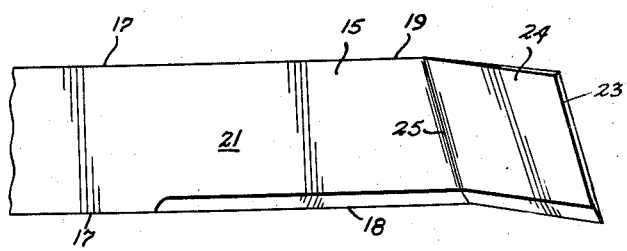
Figure 2 is a fragmentary plan view of one end thereof.

Rotary type lawn mowers are of such universal distribution and are therefore so well known that I have not shown one in the drawing. It will be understood, however, that they constitute in the simplest form a wheel or otherwise supported vertically extending powered revolvable shaft on the lower end of which the blade is releasably secured. The blade is associated with the shaft much in the manner of a conventional airplane propeller and its drive shaft with the exception that the blade is disposed to rotate on a horizontal plane at the lower end of the vertically extending powered shaft.

Referring now more particularly to the drawings, the numeral 10 designates the entire blade adapted to be applied to a rotary-type mower. It will be seen that midway the length of the initially flat elongated bar 11 I provide an aperture 12 which is adapted to receive the reduced and threaded end of the mower's revolvable shaft (not shown) and may be secured thereon by means of a conventional nut (not shown). The aperture 12 thus constitutes means to secure the bar 11 to the blade driving shaft of a rotary type mower for rotation about an axis perpendicular to the horizontal plane of said bar 11.

An indeterminate portion of the bar at its midsection is herein constituted the hub portion 13 and contains the aperture 12.

Radiating from the hub portion are diametrically opposed blade portions 14 and 15. With the blade rotating in the direction of the arrow 16 it will be seen that each side edge 17 of the bar 11 has a leading edge 18 and a trailing edge 19, the leading edge, of course, being disposed on that front edge advancing in the direction of rotation. It is desirable for most types of cutting to sharpen the leading edge 18 as seen at 20 by beveling the bar from the top side face 21 to the bottom side face 22.

The end edges 23 may be disposed obliquely with relation to the side edges 17 as shown or they may be left at right angles thereto if desirable.

Spaced inwardly from the ends along imaginary base lines 25 which angle inwardly toward the hub portion of the blade and extend from the front dege 18 to the back edge 19 of each extension, I bend the end portions upwardly to form an upwardly angled plane end portion 24. As shown in the drawing this imaginary oblique base line or bend 25 is substantially 16° from a transverse or perpendicular line relative to the side edges 17 and angles from the front edge 18 inwardly of the bar toward the aperture 12 to the back edge 19. The angular plane end portion 24 is disposed at an upward incline of substantially 45° from the plane of the blade 11. However, these angles may vary within reason. To some extent the blade will function with the angular end portions 24 bent upwardly on a base line which is perpendicular to the side edges 17 and the upward angle of the angular end portion 24 may be disposed at more or less than 45° so long as it does not substantially approach 90° from the horizontal plane of the bar 11.

Figure 3:
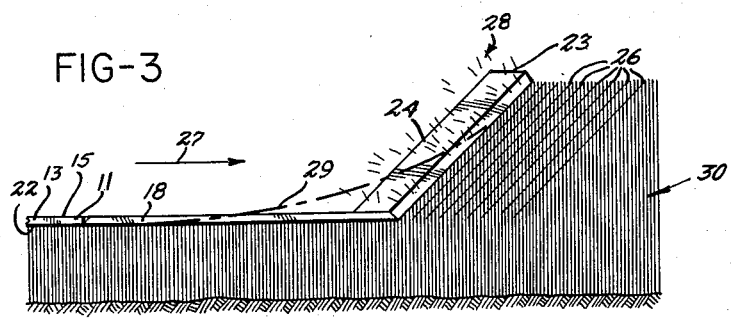
Figure 3 is a fragmentary vertical elevation showing the leading edge of the blade as it advances into the grass stalks.

In Figure 3, the series of vertical lines indicated by the numeral 30 represent the stalks of grass while the series of oblique lines indicated by the numeral 26 represent the successive cutting strokes of the rotary-type mower blade 11, while the mower is moving in the direction indicated by the arrow 27. Thus it will be seen that small portions 28 of the grass are cut at each cutting stroke of the blade and these portions may very easily fall down between the remaining stalks of grass which are cut no lower than the plane of blade rotation.

Obviously, if it were desired, the blade could be formed with an arc as indicated by the broken line 29, and a similar result would be attained. Therefore where in this specification and claims I employ the term "angularly disposed with respect to the plane of rotation," I include also the arcuate configuration.

Having thus described my invention, I claim:

1. As an article of manufacture, a rotary-type mower blade comprising an initially flat, elongated bar; said bar being provided midway its length with means to secure said bar for rotation about an axis perpendicular to the plane of said bar, whereby the side edges of said bar constitute leading and trailing eldges; and each extreme planar end portion of said bar being disposed at an upward obtuse angle, the base line of each said angular plane portion being coextensive with an oblique line angling inwardly of said blade from its leading edge to its trailing edge.

2. As an article of manufacture, a rotary-type mower blade having a hub portion adapted to be rotated in a plane perpendicular to the axis of a shaft, said hub having at least one elongated blade radiating therefrom; and said blade having an effective cutting edge disposed at a fixed upward incline with respect to the said plane of rotation.

3. An article of manufacture comprising an initially flat horizontal bar having the end portions thereof bent upwardly at coextensive obtuse angles; and means for securing the bar for rotation with said bent ends extending upwardly at a fixed outward incline with respect to its axis of rotation.

4. As an article of manufacture, a rotary-type mower blade having a hub portion adapted to be secured for rotation; and cutter blades radiating from said hub and having their free ends deflected out of the plane of rotation of said hub portion upwardly at a fixed outward incline.

References Cited in the file of this patent
UNITED STATES PATENTS

| | | |
|---|---|---|
| 1,805,927 | Sharp | May 19, 1931 |
| 2,498,796 | Downer | Feb. 28, 1950 |
| 2,697,323 | Horn | Dec. 21, 1954 |